United States Patent
Stumbo

(10) Patent No.: US 11,201,904 B2
(45) Date of Patent: *Dec. 14, 2021

(54) COVERAGE OPTIMIZED CONTENT BUFFERING

(71) Applicant: DISH Network L.L.C., Englewood, CO (US)

(72) Inventor: Joshua Stumbo, Spokane, WA (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,747

(22) Filed: Jan. 30, 2020

(65) Prior Publication Data

US 2020/0169594 A1    May 28, 2020

Related U.S. Application Data

(63) Continuation of application No. 15/858,588, filed on Dec. 29, 2017, now Pat. No. 10,587,670.

(51) Int. Cl.
*G06F 15/16* (2006.01)
*H04L 29/06* (2006.01)
(Continued)

(52) U.S. Cl.
CPC .......... *H04L 65/80* (2013.01); *H04L 65/4069* (2013.01); *H04L 65/4084* (2013.01);
(Continued)

(58) Field of Classification Search
CPC ..... H04L 1/1835; H04L 67/12; H04L 1/0002; H04L 47/522; H04L 65/608; H04L 67/18;
(Continued)

(56) References Cited

U.S. PATENT DOCUMENTS 8,495,237 B1 * 7/2013 Bilinski ................ H04W 4/029 709/231
9,247,523 B1 * 1/2016 Bhatia ..................... H04W 4/02
(Continued)

FOREIGN PATENT DOCUMENTS

EP    1777890    4/2007
EP    2901333    8/2015

OTHER PUBLICATIONS

U.S. Appl. No. 15/858,588, "Non-Final Office Action", dated May 30, 2019, 10 pages.
(Continued)

*Primary Examiner* — Dustin Nguyen
(74) *Attorney, Agent, or Firm* — Kilpatrick Townsend & Stockton LLP

(57) ABSTRACT

Described herein are systems and methods for optimizing buffering of streamed content based on upcoming coverage. For example, during a trip, the bit rate for transmission and receipt of streamed content can be dynamically adjusted based on the upcoming coverage such that when the upcoming network coverage is limited, the bit rate of the streamed content can be increased to ensure the buffer is sufficiently large to allow the user to experience (or appear to experience) uninterrupted streaming during the limited network connectivity. The bit rate can be calculated based on calculating a buffer size that can provide content at the play rate for the duration that the device is in a minimal or no network coverage area.

18 Claims, 6 Drawing Sheets

(51) Int. Cl.
- *H04W 36/02* (2009.01)
- *H04N 21/61* (2011.01)
- *H04N 21/6373* (2011.01)
- *H04W 16/18* (2009.01)
- *H04W 24/08* (2009.01)
- *H04W 64/00* (2009.01)

(52) U.S. Cl.
CPC ..... *H04L 65/4092* (2013.01); *H04N 21/6131* (2013.01); *H04N 21/6373* (2013.01); *H04W 16/18* (2013.01); *H04W 24/08* (2013.01); *H04W 36/02* (2013.01); *H04W 64/006* (2013.01)

(58) Field of Classification Search
CPC ..... H04W 4/02; H04W 4/029; H04W 36/023; H04N 21/4126; H04N 21/4524
See application file for complete search history.

(56) References Cited

U.S. PATENT DOCUMENTS

| | | | |
|---|---|---|---|
| 9,379,933 B1* | 6/2016 | Bishop | H04L 67/18 |
| 9,973,448 B2 | 5/2018 | Soelberg et al. | |
| 10,298,995 B1 | 5/2019 | Stumbo | |
| 10,587,670 B2 | 3/2020 | Stumbo | |
| 2002/0174430 A1 | 11/2002 | Ellis et al. | |
| 2006/0136581 A1 | 6/2006 | Smith | |
| 2010/0121977 A1 | 5/2010 | Kontola et al. | |
| 2012/0009890 A1* | 1/2012 | Curcio | H04L 1/0002 |
| | | | 455/230 |
| 2012/0297081 A1 | 11/2012 | Karlsson et al. | |
| 2014/0269755 A1 | 9/2014 | Veiga | |
| 2014/0344861 A1 | 11/2014 | Berner et al. | |
| 2015/0085875 A1 | 3/2015 | Phillips et al. | |
| 2015/0208120 A1 | 7/2015 | Yao et al. | |
| 2015/0208121 A1 | 7/2015 | Farnum | |
| 2015/0256581 A1* | 9/2015 | Kolhi | H04N 21/4126 |
| | | | 709/219 |
| 2015/0281303 A1* | 10/2015 | Yousef | H04N 21/4524 |
| | | | 709/219 |
| 2015/0341646 A1 | 11/2015 | Sze et al. | |
| 2016/0044129 A1 | 2/2016 | Bergmann et al. | |
| 2016/0057639 A1* | 2/2016 | Smith | H04W 4/029 |
| | | | 455/423 |
| 2016/0065995 A1 | 3/2016 | Phillips | |
| 2016/0234078 A1 | 8/2016 | Jana et al. | |
| 2016/0248704 A1* | 8/2016 | Soelberg | H04L 47/522 |
| 2017/0013406 A1* | 1/2017 | Oliver | H04L 65/608 |
| 2017/0063704 A1 | 3/2017 | Krinsky | |
| 2017/0134459 A1 | 5/2017 | Shetty et al. | |
| 2018/0007161 A1* | 1/2018 | Hwang | H04L 67/12 |
| 2018/0070273 A1* | 3/2018 | Sleight | H04W 36/023 |
| 2018/0255117 A1* | 9/2018 | Ljung | H04L 1/1835 |
| 2019/0045399 A1 | 2/2019 | Bongaarts et al. | |
| 2019/0238924 A1 | 8/2019 | Stumbo | |

OTHER PUBLICATIONS

U.S. Appl. No. 15/858,588, "Notice of Allowance", dated Nov. 1, 2019, 7 pages.
U.S. Appl. No. 15/859,153, "Non-Final Office Action", dated Sep. 5, 2018, 11 pages.
U.S. Appl. No. 15/859,153, "Notice of Allowance", dated Jan. 7, 2019, 8 pages.
U.S. Appl. No. 16/378,358, "Non-Final Office Action", dated Jan. 2, 2020, 7 pages.
U.S. Appl. No. 16/378,358, "Notice of Allowance", dated Apr. 8, 2020, 7 pages.
PCT/US2018/067031, "International Search Report and Written Opinion", dated Mar. 27, 2019, 13 pages.
Theera-Ampornpunt et al., "TANGO: Toward a More Reliable Mobile Streaming through Cooperation between Cellular Network and Mobile Devices", IEEE 35th Symposium On Reliable Distributed Systems (SRDS), Sep. 26, 2016, pp. 297-306.
International Preliminary Report on Patentability for PCT/US2018/067031 dated Jun. 30, 2020, all pages.

* cited by examiner ion Ser. No. 15/858,588, entitled "COVERAGE OPTI-
COVERAGE OPTIMIZED CONTENT BUFFERING

CROSS-REFERENCE TO RELATED APPLICATIONS

This application is a continuation of U.S. patent application Ser. No. 15/858,588, entitled "COVERAGE OPTIMIZED CONTENT BUFFERING," filed on Dec. 29, 2017 which issued as U.S. Pat. No. 10,587,670 on Mar. 10, 2020. The content of the above application is hereby incorporated by reference in its entirety for all purpose.

BACKGROUND

When traveling for any distance through areas of minimal network coverage, the customer experience of viewing or listening to streaming content can be painful. While the trip may occasionally dip into minimal network coverage areas, there may be other periods with excellent network coverage and excess bandwidth availability. Systems and methods are needed to utilize the high quality network coverage areas in anticipation of the poor or minimal network coverage areas.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect can include a method for optimizing buffering of streamed content based on network coverage for an area in which the user is travelling. The method can include receiving streaming content at a device of a user, where the receiving includes receiving the content at a bit rate, the bit rate including a nominal bit rate of a rate at which the device plays the content without interruption and a buffer bit rate for buffering a portion of the content in a buffer over a period of time. The method can also include determining a route of the user and identifying network coverage availability of the route. The method can also include calculating a coverage buffer size to provide uninterrupted play of the content by the device based on a physical speed of the device (e.g., velocity of the vehicle) and the network coverage availability of the route. The method can also include calculating a coverage bit rate based on the coverage buffer size and dynamically requesting an adjust bit rate based on the coverage bit rate. Other embodiments of this aspect include corresponding computer systems, apparatus, and computer programs recorded on one or more computer storage devices, each configured to perform the actions of the methods.

Implementations may include one or more of the following features. Optionally, the route of the user can be predicted based on a historical route. Optionally, the route can be obtained from a mapping application. Optionally, the user can provide a user buffer size limit via a user interface. Optionally, the coverage buffer size is larger than the user buffer size limit and the coverage buffer size can be limited to the user buffer size limit. Optionally, identifying network coverage availability of the route can include identifying a first area having a quality of coverage that is at least a threshold quality of coverage and identifying a second area having a quality of coverage that is below the threshold quality of coverage after the first area in the route. Optionally, calculating the coverage buffer size to provide uninterrupted play of the content by the device based on a physical speed of the device and the network coverage availability of the route can include calculating a duration of the device being in the second area based on the physical speed of the device and a distance of the route of the user through the second area, and the coverage buffer size can be calculated based on the duration of the device being in the second area and the nominal bit rate. Optionally, calculating the coverage bit rate can include calculating a duration of the device being in the first area based on the physical speed of the device and a distance of the route of the user through the first area, and the coverage bit rate can be calculated based on the coverage buffer size and the duration of the device being in the first area. Optionally, the adjusted bit rate can be the coverage bit rate plus the nominal bit rate and dynamically requesting the adjusted bit rate can include requesting the adjusted bit rate when the device reaches the first area. Optionally, dynamically requesting the adjusted bit rate can include requesting a slower bit rate when the device reaches the second area. Optionally, the content can be streaming video content or streaming audio content. Implementations of the described techniques may include hardware, a method or process, or computer software on a computer-accessible medium.

DETAILED DESCRIPTION

Described herein are systems and methods that utilize high quality network coverage areas (e.g., 4G or 5G network availability) to adjust the streaming bit rate to allow a user device to build a buffer sufficient to provide uninterrupted content to the user while travelling through minimal or poor network coverage areas (e.g., talk, text, and non-LTE data areas or unavailable signal areas). The upcoming route can be identified and coverage map data points (either existing or built by the user device) can be used to identify areas within the route that will suffer from poor or no network availability as the device travels the route. For example, while the device is travelling along the route, and the user is streaming content, the system can interpolate the most likely cell tower the device will use next as it progresses on the trip. If the next cell tower will likely have less network bandwidth than the current tower, the system can request more bytes (an increased bit rate) from the content delivery network. The modified bit rate can be calculated using the nominal playout rate, the rate of travel of the mobile device, and the time the device will spend in the sub-optimal coverage area. On a defined route the system can build a buffering plan for the entire trip to provide just in time buffering to ensure proper coverage, but not overwhelm any one cell tower or over buffer data when not needed. The system can also be optimized to save the network operator costs by minimizing the amount of data moved through partner cell towers.

Figure 1:
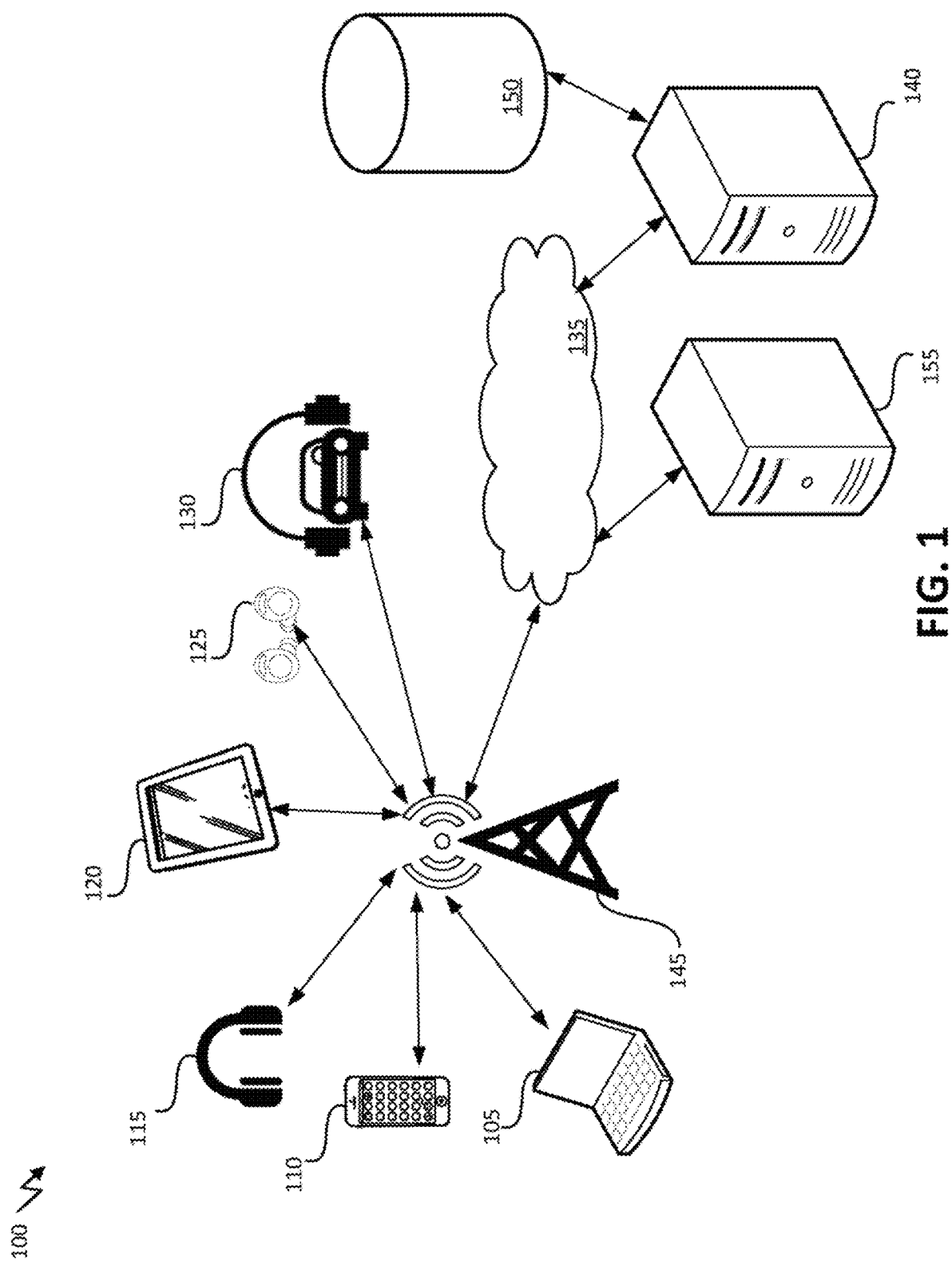
FIG. 1 illustrates an example system for providing coverage optimized content buffering.

FIG. 1 illustrates an exemplary high level diagram of a system 100 for providing optimized content buffering. The system 100 can include user devices including a laptop 105, a mobile phone 110, headphones 115, a tablet 120, in-ear phones 125, and a vehicle stereo 130. The system 100 can also include a network 135, a content provider 140, a cell tower 145, a content database 150, and a server 155.

The user devices depicted in system 100 are examples of user devices. Laptop 105 can be any suitable laptop with audio, video, and cellular networking capabilities. Mobile phone 110 can be any suitable smartphone with audio, video, and cellular networking capabilities. Headphones 115 can be wireless headphones that have the capability to download and/or stream audio content via network 135 through cell tower 145. Tablet 120 can be any suitable tablet with audio, video, and cellular networking capabilities. In-ear phones 125 can be any in-ear wireless headphones that have the capability to download and/or stream audio content via network 135 through cell tower 145. Vehicle stereo 130 can be any portable stereo, whether in a vehicle or not, capable of downloading and/or streaming audio and/or video content via network 135 through cell tower 145. Though only one of each user device is depicted, any number of each of the user devices depicted can be included in system 100. Further, other types of user devices, though not depicted, can be included in system 100. For example, a smartwatch, a wireless voice-controlled speaker (e.g., Amazon Echo® or Google Home®), or any other suitable, portable device with audio and/or video capability and the capability to download and/or stream audio and/or video content via network 135 through cell tower 145.

Network 135 can be can be any type of network including the Internet, a local area network ("LAN"), a wide area network ("WAN"), a virtual network, a cloud network, or a telecommunications network. Network 135 can be implemented as a wired network and/or wireless network. Network 135 can be any suitable network for allowing communication between one or more user devices and content provider 140.

Content provider 140 can be any suitable content provider, such as for example, a television service provider, a movie service provider, a music service provider, or any other content provider. Content provider can be any suitable computer system, such as computer system 600 of FIG. 6, that has components and processing capability to facilitate communication over network 140 and processing capability to retrieve and stream audio and/or video content to the user devices as described in more detail herein. Content database 150 can be any suitable storage device that the content provider 140 can communicate with to store content in and to obtain content from for distribution to the user devices. The content provider 140 and the content database 150 can be portions of the content delivery network.

Cellular tower 145 can be any cellular tower that allows the user devices to connect to network 135. Cellular tower 145 can provide the user devices 105, 110, 115, 120, 125, and 130 access to a cellular network or data network provided to mobile devices (e.g., 4G network, 5G network, or any other suitable mobile or cellular network). While only one cellular tower 145 is depicted, there can be any suitable number of cellular towers 145.

Figure 6:
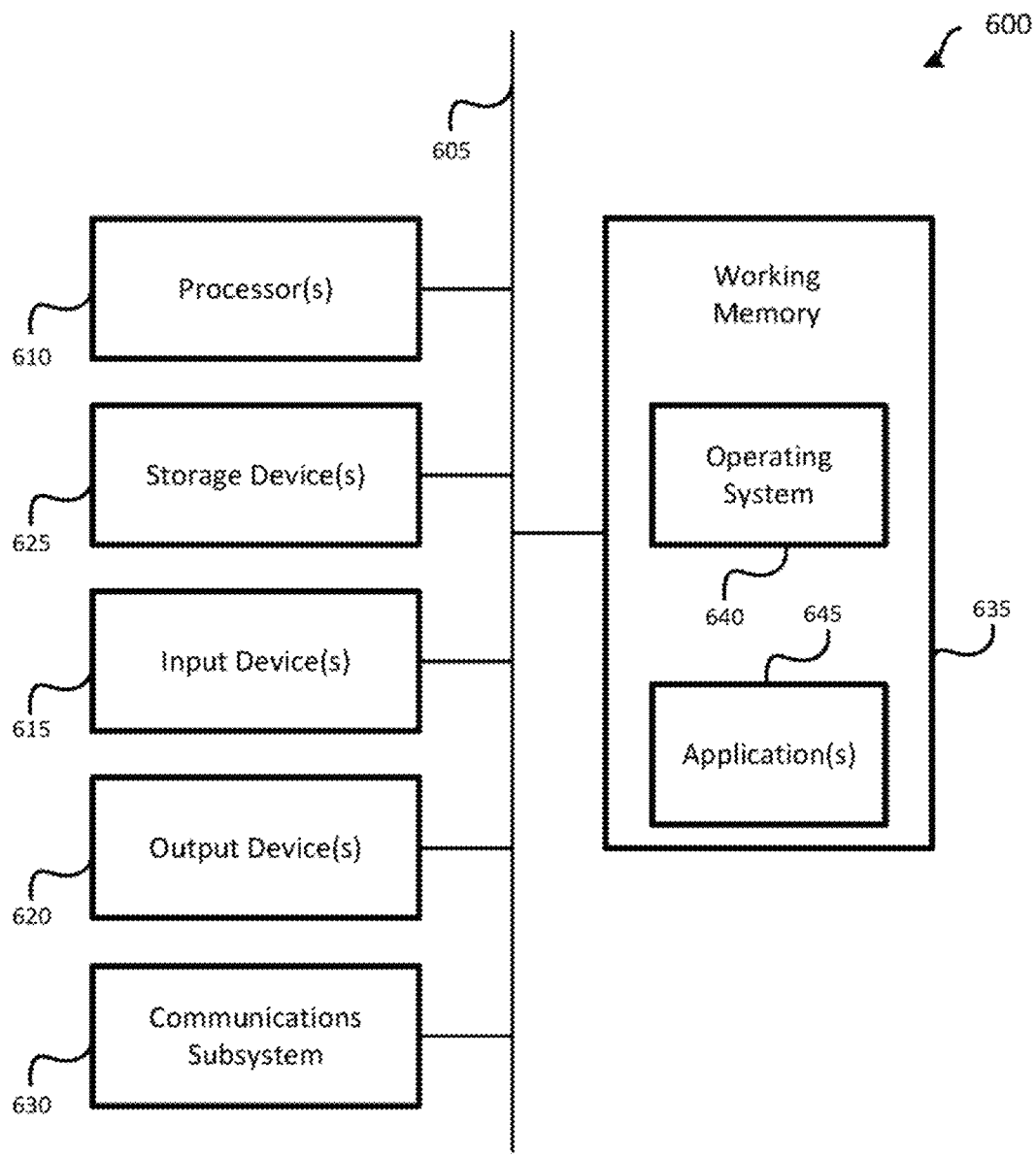
FIG. 6 illustrates an example computer system.

Server 155 can be any suitable computer system, such as computer system 600 of FIG. 6. Server 155 can provide, for example, cloud processing functionality to the user devices for calculating the optimized bit rate as described in more detail herein. Server 155 can be implemented in a cloud service, a server farm, a single server, a user managed server, or any other suitable server.

In use, any one or more of the user devices 105, 110, 115, 120, 125, and/or 130 can request and obtain streaming content from content provider 140 via cell tower 145 and network 135. The user devices can be travelling on a route that includes network coverage that changes by virtue of distance from cellular tower 145 or switching between cellular towers 145, some of which may not have as much bandwidth. As the user device travels on a route that is known (e.g., mapped) or that can be predicted (e.g., because it is traveled regularly), the user device can provide information to server 155 about its streaming activity, the bit rate, the route, user settings, and so forth. The server 155 can use the route information to identify that the available cellular tower 145 access based on distance or changing to a new cellular tower 145 that has more or less available bandwidth and calculate an adjusted bandwidth for the user device. Optionally, the user device can perform the calculation. The user device can then request an adjusted bit rate from the content provider 140. For example, the user device can request an increased bit rate to build up a buffer sufficient to allow the user to continue to stream the content from the buffer during areas of lesser network access such that the content is played without interruption.

Figure 2:
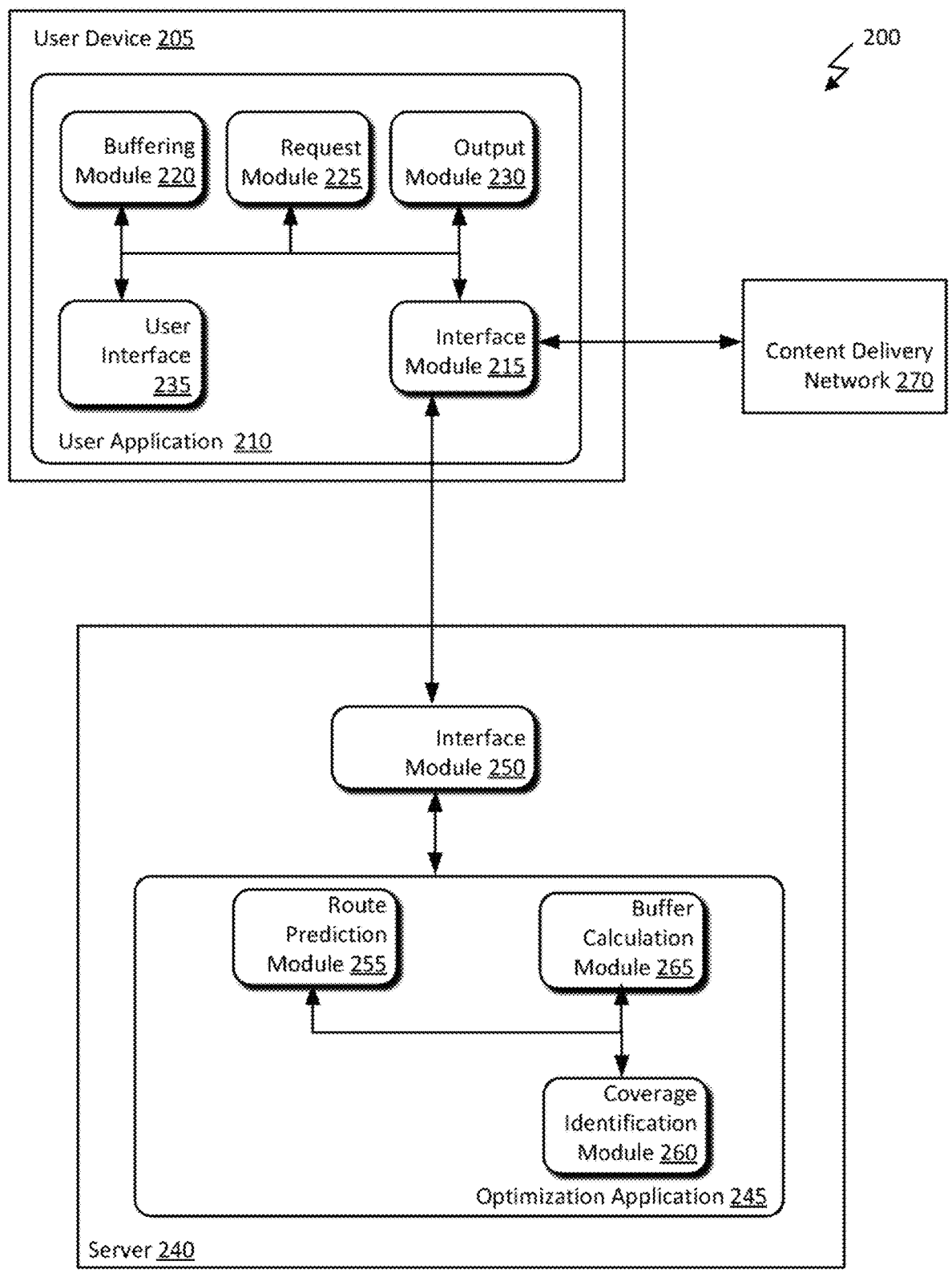
FIG. 2 illustrates an example simplified block of a system for providing coverage optimized content buffering.

FIG. 2 illustrates a simplified block diagram of a system 200 for coverage optimized content buffering. The system 200 can include a user device 205, a content delivery network 270, and a server 240. The system can be system 100 of FIG. 1. Optionally, the functionality provided by server 240 can be provided within user device 205 or even content delivery network 270.

Content delivery network 275 can include content provider 140 and content database 150 of FIG. 1, for example. The content delivery network 270 can be provided by any suitable service provider such as a television or cable provider, a music provider, a movie or television show provider, or any other content provider. The content delivery network 270 can store the content and serve it to user device 205 upon request. Optionally, the content delivery network 270 can include features such as, for example, authentication functionality.

User device 205 can include a user application 210. The user application 210 can be a streaming application for streaming content including, for example, video or audio content. The user application 210 can include an interface module 215 for interfacing with the server 240 and the content delivery network 270. The user application 210 can also include a buffering module 220, a request module 225, an output module 230, and a user interface 235. While described as specific modules 215, 220, 225, 230, and 235, the functionality of each of the modules can be combined or separated into fewer or more modules without affecting the scope of the disclosure herein.

Buffering module 220 of user application 210 can receive the incoming content as a data stream and store it in a buffer of user device 205. Output module 230 can use the buffer for outputting the content to a speaker or display (not shown) of user device 205. Optionally, if the incoming bit rate from content delivery network 270 is the nominal bit rate to support playback with no buffering, the buffering module 220 may not store the content in the buffer and the content stream can pass right to output module 230 for outputting the content for the user to consume. Optionally, the nominal bit rate is slightly more than the playback rate such that a small or standard amount of buffer (e.g., 10 kilobytes) are stored in the buffer.

Request module 225 can request an increased or decreased bit rate from content delivery network 270. For example, an increased bit rate over the nominal bit rate will increase the buffer because the nominal bit rate (the rate at which the user device 205 plays the content) will not change. If the incoming bit rate is higher than the nominal bit rate, the buffering module 220 will store the incoming content stream in the buffer, which will grow, since the incoming content stream is faster than the output module 230 outputs the content stream for user consumption. If the incoming bit rate is lower than the nominal bit rate, the buffering module 220 will pass content from the buffer to the output module 230 faster than the incoming content stream, which will deplete the buffer. If the buffer becomes depleted and the incoming bit rate from the content delivery network is less than the nominal bit rate, the user will experience lag in their content such as paused audio or video. The requested bit rate can be provided by the buffer calculation module 265 of optimization application 245 on server 240.

The user interface 235 can provide a user interface to the user of user device 205 to allow the user to set settings or otherwise interface with the user application 210. For example, the user can set a buffer setting through user interface to increase or decrease a maximum buffer size. The user can also user the user interface 235 for playback control, for example, such as to rewind or fast forward the content to the extent the buffer has stored the content, pause or stop the content, or change the content selection to a different movie, show, or song, for example.

Server 240 can be, for example, server 155 of FIG. 1. Server 240 can include optimization application 245 and interface module 250. Interface module 250 can allow the server 240 to communicate with user device 205 via interface module 215. Optimization application 245 can include route prediction module 255, coverage identification module 260, and buffer calculation module 265. While described as specific modules 255, 260, and 265, the functionality of each of the modules can be combined or separated into fewer or more modules without affecting the scope of the disclosure herein. Further, the functionality of optimization application 245 or any portions of it can be performed by user device 205 and/or content delivery network 270 without affecting the scope of the disclosure herein.

Route prediction module 255 can predict or determine the route that user device 205 will be taking as well as determining a rate of speed of user device 205. Optionally, route prediction module 255 can receive the route information from user device 205. For example, user device 205 can have a mapping application that user application 210 can interface with to obtain the upcoming route and provide that the route prediction module 255.

Coverage identification module 260 can identify the coverage in the upcoming route for user device 205 based on the route identified by route prediction module 255. For example, coverage identification module can build a coverage map with data points for known coverage in areas based on previous travel through the area of various user devices. As another example, existing coverage maps with known coverage values for data points can be used to identify the coverage. Coverage identification module 260 can also identify the provider or owner of the cell tower that provides the coverage in a specific area. Based on the carrier for user device 205, coverage identification module 260 can also determine whether coverage for a specific area is provided by the user device 205 carrier or a partner. The coverage maps that are existing or built can provide information about signal strength based on distance from the cell tower providing service to that area as well as the level of service provided by the cell tower. For example, a cell tower can provide 4G data services, non-LTE (long term evolution) services, 5G data services, and so forth. Each cell tower can have an estimated range for providing the service at various levels of quality (e.g., the closer the user device 205 is to the cell tower, the higher quality the service can be). Further, each cell tower can have a standard level of bandwidth based on population in the area. Optionally, server 240 can request a current bandwidth level from the cell tower to include in the calculation. Once this information is identified, coverage identification module 260 can score the service level based on the predicted type of service (e.g., none, non-LTE, 4G, 5G, and so forth) and the quality of service in a given area (e.g., strong service, weak service, low bandwidth from the tower, and so forth). The score can be any suitable score for identifying distinctions between areas of service along the route such that, for example, a first area has a higher score than a second area if the first area has stronger and/or better quality service than the second area.

The buffer calculation module 265 can use the route information with the scored areas to calculate a buffer value and bit rate the user device 205 can request from the content delivery network 270. Optionally, the buffer calculation module 265 can perform the calculations for an entire trip and provide a full buffer plan. Optionally, the user device 205 can periodically request buffer calculations from the server 240 and the optimization application 245 can perform the calculations for an upcoming portion of the route. Buffer calculation module 265 can determine, based on the speed of the user device 205 (e.g., the speed of the vehicle) how long the user device 205 will be in each area of coverage. Once the duration the user device will be in each area is known, and given the nominal bit rate, the buffer calculation module can determine the size of the buffer needed for low scoring areas. For example, if there is no service in an area and the user device will remain in that area for 10 minutes, the buffer needs to be sufficient to store 10 minutes worth of content playback at the nominal bit rate. Once the buffer calculation module knows the duration the user device will be in the high scoring areas leading up to low scoring areas, it can determine an appropriate bit rate to request (e.g., the nominal bit rate+a bit rate sufficient to fill the buffer of the needed size over the time the user device 205 will be in the higher quality area). The buffer calculation module 265 can develop a plan for the user device 205 based on the upcoming route and provide the appropriate bit rate values to request and when to request them to the request module 225 of user application 210 on the user device 205 through interface modules 250 and 215.

Figure 3:
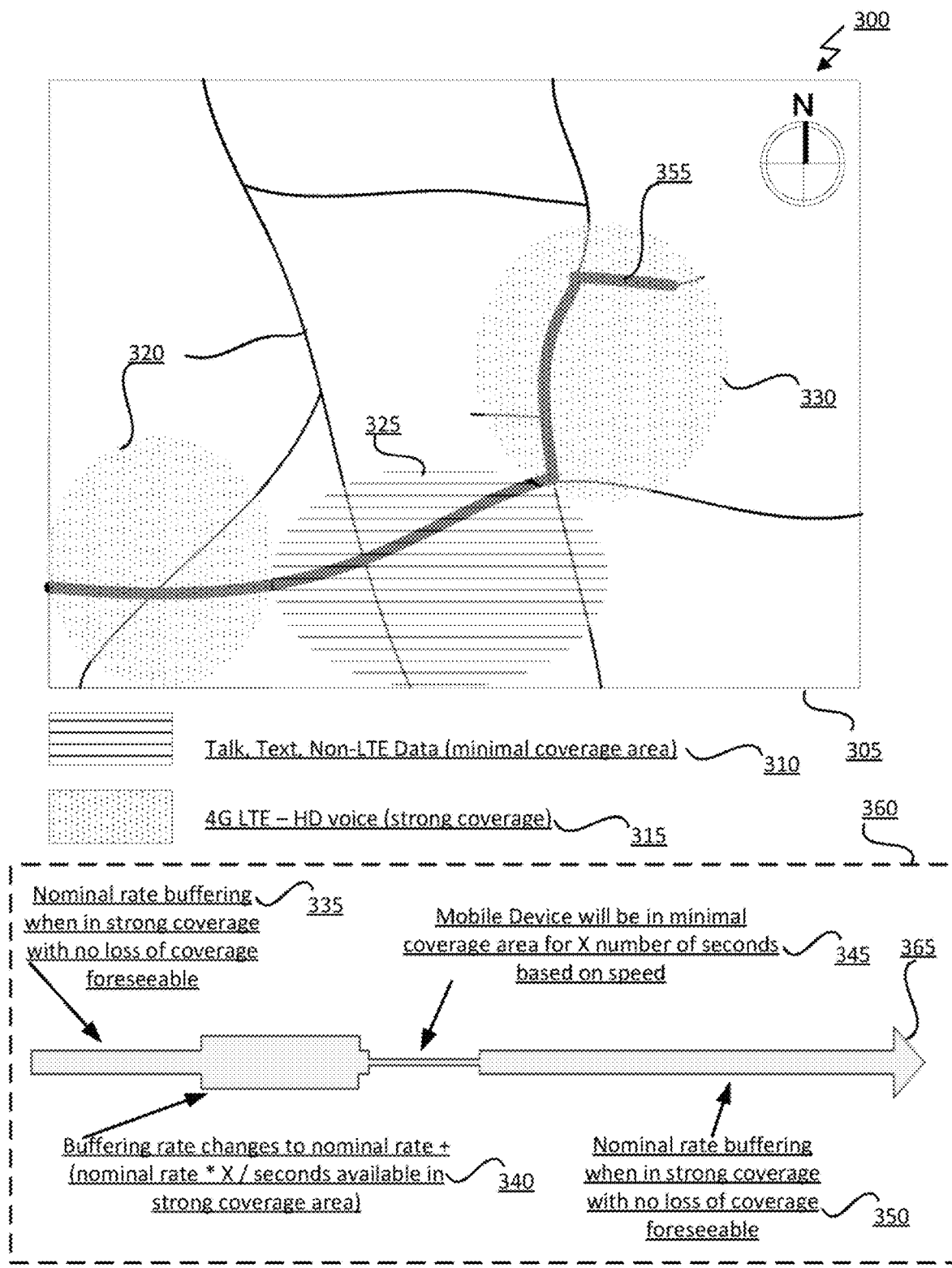
FIG. 3 illustrates an example map and key diagram for providing coverage optimized content buffering.

FIG. 3 illustrates an example map and key diagram 300 further explanation of providing coverage optimized content buffering. Optionally, diagram 300 can be provided in a user interface (e.g., user interface 235 of FIG. 2) to the user. Diagram 300 includes a map 305, key data 310 and 315, and plan image 360.

Map 305 contains a map of an area that shows the user device route 355. The route includes three separate coverage areas. The first coverage area 320 can be near the beginning of the route (e.g., an area the user device will travel through before coming to the second coverage area 325 or the third coverage area 330). The first coverage area 320 can be an area through which the user device will travel along its route 355 that has network availability as shown by key 315 (i.e., 4G LTE data, high definition voice). The first coverage area 320, based on the map 305 or information provided to develop the map 305, is serviced by one or more cell towers that provide strong coverage of high quality. The second coverage area 325 can be an area through which the user device will travel along its route 355 after traveling through the first coverage area 302. The second coverage area 325 has network availability as shown by key 310 (i.e., Talk, Text, Non-LTE Data). The second coverage area 325, based on the map 305 or information provided to develop the map 305, is serviced by one or more cell towers that provide minimal coverage or weak coverage of lesser quality than those servicing the first coverage area 320. The third coverage area 330 can be an area through which the user device will travel along its route 355 after traveling through the second coverage area 325. The third coverage area 330, based on the map 305 or the information provided to develop the map 305, is served by one or more cell towers that provide strong coverage of high quality. Key information 310 and 315 provide the key for reading the coverage areas on map 305.

Plan image 360 can illustrate the buffering plan developed by, for example, buffer calculation module 265 of FIG. 2. The plan image 360 can include explanations 335, 340, 345, and 350 for the changes and sections seen in the buffering arrow 365. For example, the explanation 335 for the first portion of buffering arrow 365 can be for an area not shown on map 305. Explanation 340 can explain the change in buffering during the time travelling through the first coverage area 320. The explanation 345 can explain the change in buffering during the time travelling through the second coverage area 325. The explanation 350 can explain the change in buffering during the time travelling through the third coverage area 330. As can be seen, because the second coverage area 325 is not as high of a quality as the first coverage area 320, the buffering during the time travelling through the first coverage area 320 can be increased by requesting the content delivery network increase the bit rate of the stream to the user device to allow the user device to build a larger buffer which can be used to continue the playback of the content while travelling through the second coverage area 325 where network availability is not as strong. During the time travelling through the third coverage area 330, the buffering can return to normal, or the same as it was during the initial area as described by explanation 335.

Figure 4:
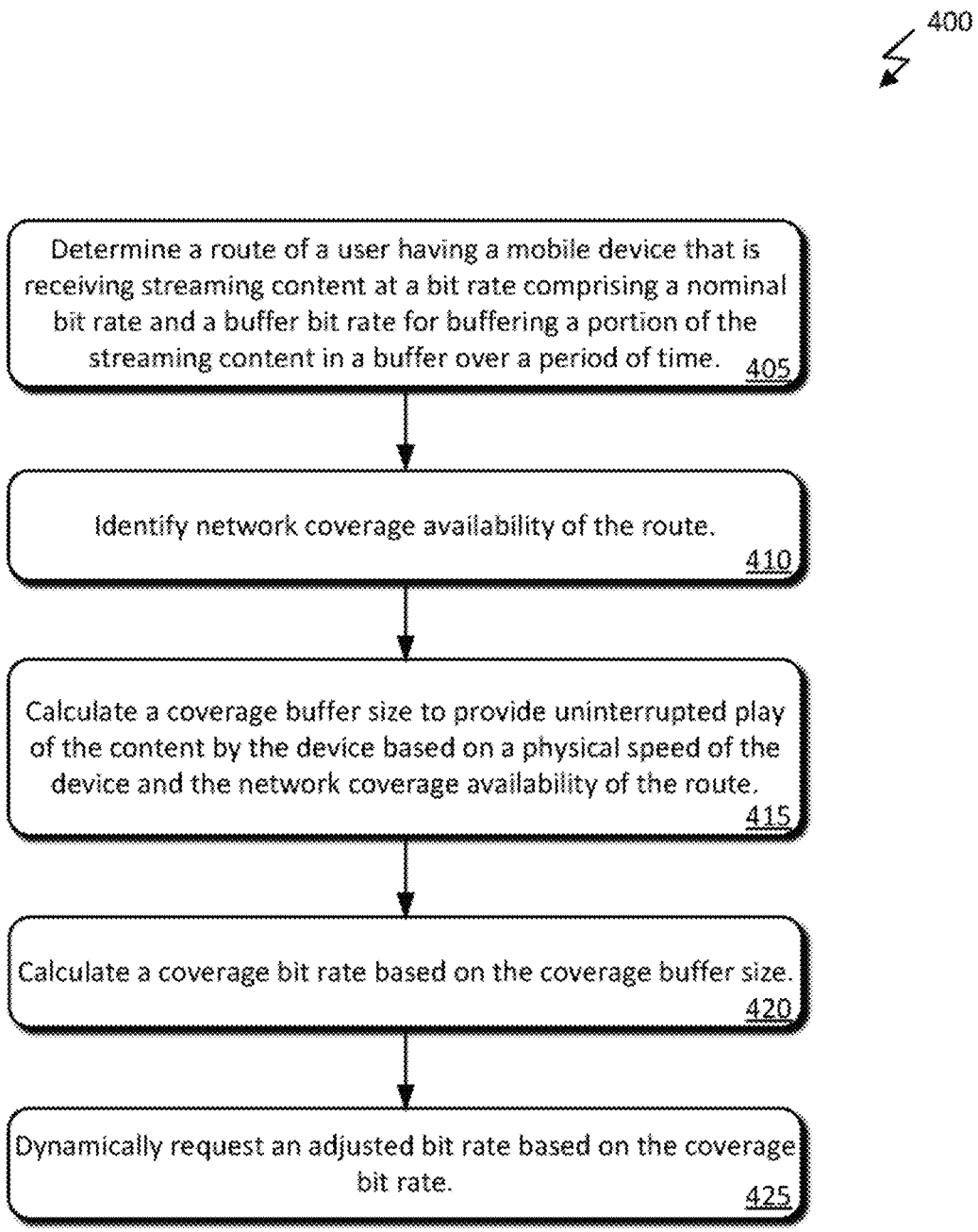
FIG. 4 illustrates an exemplary method for providing coverage optimized content buffering.

FIG. 4 illustrates an example method 400 for coverage optimized buffering. Method 400 can be performed by, for example, user device 205 of FIG. 2 or server 240 of FIG. 2.

Method 400 can begin at 405 with the system determining a route of a user having a mobile device that is receiving streaming content at a bit rate comprising a nominal bit rate and a buffer bit rate for buffering a portion of the streaming content in a buffer over a period of time. Step 405 can be performed by route prediction module 255 of FIG. 2, for example. The user can be travelling in, for example a vehicle (e.g., a car or a motorcycle). Optionally, the user can be riding public transportation (e.g., a bus or train). Optionally, the user can be travelling by foot (e.g., walking or running). Optionally, the user can be travelling on a non-motorized vehicle (e.g., a bicycle or a skateboard). While travelling, the user can be streaming content (movies, television shows, music, and so forth) which can be provided by a content delivery network via a cellular network to the user's mobile device. The streaming content can be provided by the content delivery network at a bit rate. Nominal bit rate transmissions/streams allow for continuous play of streamed content without pauses for receipt of sufficient data to play the content. Such a nominal bit rate can optionally include an additional amount of bit rate to ensure a small buffer is maintained by the mobile device to account for network disturbances or other reasons why the receipt of the stream may be interrupted or disturbed. For example, a nominal bit rate can be 500 kbps (kilobits/second), which can allow the user to play the streaming content and maintain a small buffer. To maintain a larger buffer, the bit rate can be increased to, for example 1000 kbps, which would increase the size of the buffer since the playback rate does not change. The route of the user can be determined by, for example, predicting the route based on historical information. For example, if the user drives home from work daily at approximately the same time, when the user begins to travel at that time, the mobile device may recognize, based on previous habits, that the user may be travelling home. Optionally, the user may have a mapping application that can provide the route. Optionally, the user can use a public transportation application that can provide the route and/or route information.

At 410, the system can identify network coverage availability of the route. Step 410 can be performed by coverage identification module 260 of FIG. 2. The system can utilize existing coverage map information or databases to identify points of coverage and areas of coverage along the route. The areas of coverage can be scored. For example, a low score of, perhaps 3 can be assigned to an area in which coverage is not LTE data, for example. An even lower score of perhaps 1 can be assigned to an area in which coverage is not LTE data and the coverage is provided by a partner of the carrier of the user device, for example. Giving a lower score to a partner covered area can help ensure that carrier costs are reduced by using less data in areas covered by partners rather than the carrier. A score of 0 can be assigned to an area in which there is no coverage. A score of perhaps 3 can be assigned to an area in which coverage is LTE or high quality data (e.g., 4G, 5G, and so forth) that is covered by a partner carrier. A score of 5 can be assigned, for example, to an area in which coverage is LTE or high quality that is covered by the carrier. Any suitable scoring method can be used to identify the movement between different coverage areas during the course of a route.

At 415, the system can calculate a coverage buffer size to provide uninterrupted play of the content by the device based on a physical speed of the device and the network coverage availability of the route. For example, a route can include a first coverage area that has high quality service, a second coverage area that has a lower quality service, and a third coverage area that has a high quality service. The route can take the user and his device through the first area, then the second area, then the third area similar to the route 355 of FIG. 3. The system can determine the speed of the mobile device. For example, during the route the user can travel on average 50 mph (miles per hour). Optionally, if the route is based on historical information, the system can identify a historical speed that the user has traveled in previous trips. Optionally, the speed can be obtained as an average based on information from a GPS on the mobile device. Any suitable method for determining the speed of the mobile device can be used. Based on the distance of the route through each area and the speed of the mobile device, the system can determine how long the user device will remain in each coverage area. As an example, the user may be in the first area for 300 seconds, the second area for 260 seconds, and the third area for 400 seconds based on an average speed of 50 mph and a distance of 4.2 miles for the first area, 3.6 miles for the second area, and 5.6 miles for the third area. The coverage buffer for the second area, continuing the example, needs to be able to play the content for 260 seconds while the coverage area is sub-optimal. Optionally, the user can use a user interface to set a maximum buffer size which can be less than the coverage buffer size. Optionally, when the user sets a limit below the calculated coverage buffer size, the coverage buffer size can be set to the limit. Optionally, the user interface can display a notification to the user that the limit may cause playback issues or that the buffer may be insufficient to allow for uninterrupted playback of streamed content through areas with little or no network coverage.

At 420, the system can calculate a coverage bit rate based on the coverage buffer size. For example, continuing the example above, a bit rate can be calculated to collect sufficient content in the buffer during the 300 seconds of travelling through the first area to ensure the playback can continue from the buffer during the 260 seconds of travel through the second area. Optionally, the calculation can include an expected bit rate during travel through the second area. For example, the bit rate through the second area can be requested by the user device or may be limited by the network to a bit rate that is lower than the nominal bit rate. A bit rate that is below the nominal rate can feed into the buffer to stop it from rapidly depleting. Optionally, the calculation can include an existing buffer size because there may be some buffer already in place. Optionally, the user can use a user interface to limit the buffer size as previously noted. In such cases, the system can make appropriate adjustments to, for example, increase the bit rate through sub-optimal coverage areas such as, for example, increasing the bit rate in coverage areas that have a lower ranking primarily due to service being provided by partner carriers. If the entire route is known, the system can calculate a buffering plan and provide that to the mobile device and dynamically request an adjusted bit rate as each area is reached based on the buffering plan.

At 425, the system can use the coverage bit rate information to request an adjusted bit rate from the content delivery network. For example, at the beginning of the second coverage area (when the mobile device reaches the first coverage area), the mobile device can request that the content delivery network provide the streamed content at a higher bit rate to build a buffer of the coverage buffer size for use through the second area. For example, the nominal rate plus the coverage bit rate can be requested as the adjusted bit rate. When the mobile device reaches the second coverage area, the mobile device can request that the content delivery network provide the streamed content at a lower bit rate based on the buffering plan.

Figure 5:
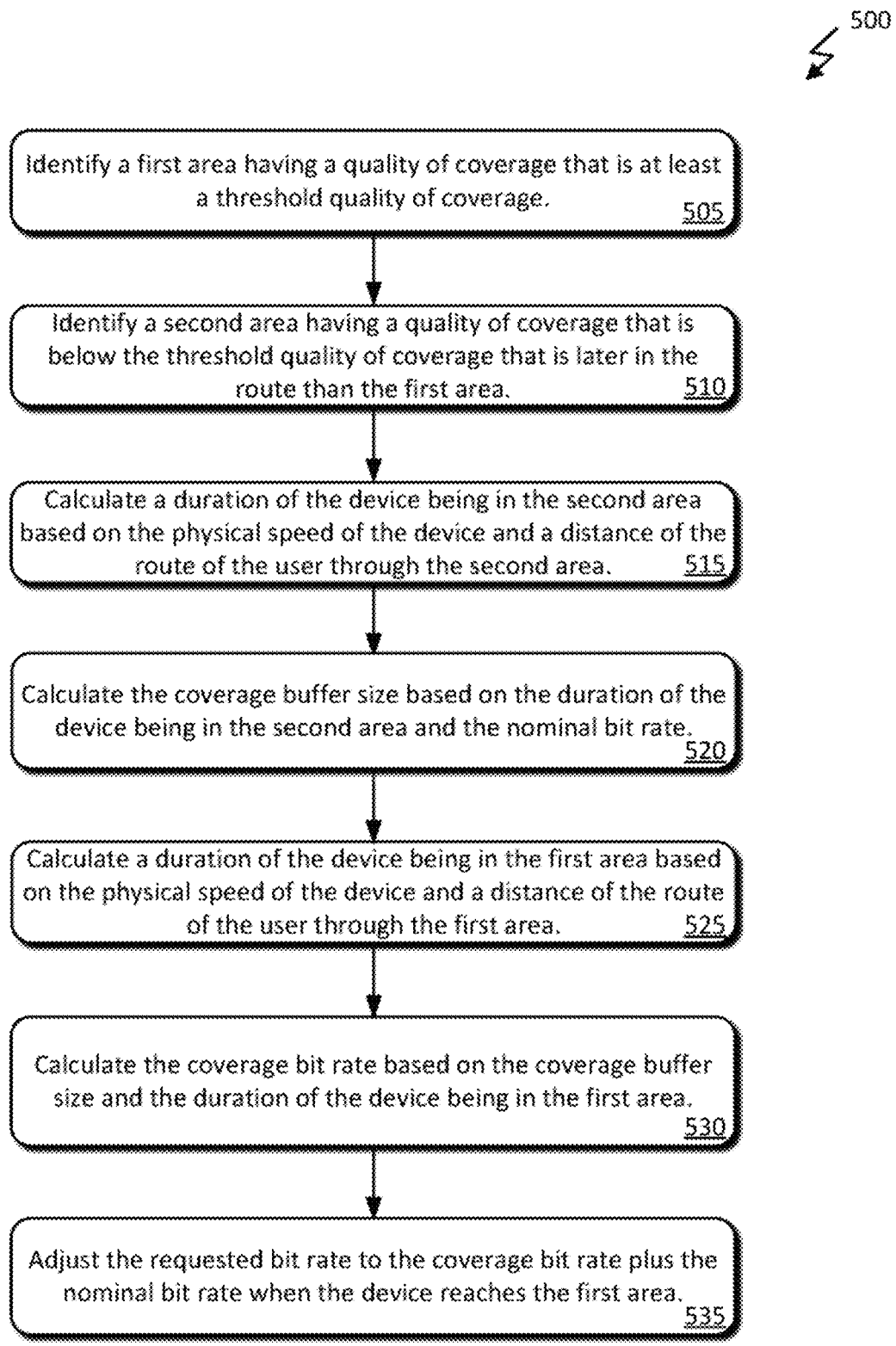
FIG. 5 illustrates another exemplary method for providing coverage optimized content buffering.

FIG. 5 illustrates a method 500 for coverage optimized buffering. Method 500 can be performed by, for example, user device 205 of FIG. 2 or server 240 of FIG. 2. Method 500 can be performed with method 400 to provide additional detail. For example, at 505 of method 500, the system can identify a first area having a quality of coverage that is at least a threshold quality of coverage. As discussed with respect to step 410 of FIG. 4, the network coverage areas can be identified and scored. The scores can be compared to a threshold value for determining whether the area can be used to increase the buffer or may need additional buffered data because of weak or sub-optimal network coverage. Similarly, at 510, the system can identify a second area having a quality of coverage that is below the threshold quality of coverage that is later in the route than the first area. As an example, the first coverage area 320 had a strong network availability and the second coverage area 325 had a sub-optimal network availability.

At 515, the system can calculate a duration of the device being in the second area based on the physical speed of the device and a distance of the route of the user through the second area. As noted in the example discussed in FIG. 4, at 50 mph travelling 3.6 miles, the user would be in the second area for 260 seconds. At 520, the system can calculate the coverage buffer size based on the duration of the device being in the second area and nominal bit rate. As noted before, the nominal bit rate can be the rate at which the content is streamed to ensure consistent playback without filling a buffer. Given the nominal bit rate, the system can know at what rate the content is played. Given the time (e.g., 260 seconds) of being in a suboptimal area, the system can determine the size of the buffer needed. For example, 500 kbps (kilobits/second) for 260 seconds would result in a buffer size of approximately 16 Megabytes.

At 525, the system can calculate a duration of the device being in the first area based on the physical speed of the device and a distance of the route of the user through the first area. As an example as noted in the example discussed in FIG. 4, at 50 mph travelling 4.2 miles, the user would be in the first area for 300 seconds. At 530, the system can calculate the coverage bit rate based on the coverage buffer size and the duration of the device being in the first area. To continue the example, the coverage buffer size of 16 Megabytes can be used and the time of 300 seconds can be used to determine that the coverage bit rate for building a buffer of 16 megabytes over 300 seconds is 433 kbps. At 535, the requested bit rate can be adjusted for the duration of travel through the first area to 933 kbps, which accounts for the nominal bit rate of 500 kbps and the coverage bit rate of 433 kbps.

FIG. 6 illustrates an embodiment of a computer system 600. A computer system 600 as illustrated in FIG. 6 may be incorporated into devices such as a television receiver, DVR, television, media system, personal computer, smartphone, tablet, and the like. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, a remote control, and/or the like; and one or more output devices 620, which can include without limitation a display device, a printer, and/or the like.

The computer system 600 may further include and/or be in communication with one or more non-transitory computer-readable storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device may be incorporated into the computer system 600 as an input device 615. In many embodiments, the computer system 600 will further comprise a working memory 635, which can include a RAM or ROM device, as described above.

The computer system 600 also can include software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIGS. 4 and 5, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 640 and/or other code, such as an application program 645, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Described throughout has been methods and systems for converting audio-video content into audio only content. Additionally, other forms of content can be converted to audio-only content. For example, audio only content and/or text only content can be converted using the techniques above to generate audio only content. For example, audio only content can be translated to a different language to provide converted audio only content. Text only content has the same problem as audio-video content in that the content needs to be consumed visually. When driving, for example, the user cannot (and should not) be reading text content.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method comprising:
   determining a route of a mobile device over which the mobile device is determined to be receiving streaming content via a plurality of cell towers; and
   generating a buffering plan for the route, by the mobile device, by:
   identifying a plurality of cell towers predicted to provide service coverage for the mobile device as it travels along the route, such that each cell tower provides the service coverage for the mobile device via which to receive the streaming content in an associated portion of the route;
   predicting a network coverage availability of the route by predicting, for each cell tower, a respective adjusted bandwidth available to provide the service coverage to the mobile device in the associated portion of the route, wherein the respective adjusted bandwidth for a first associated portion of the route is predicted to provide a quality of coverage above a threshold quality of coverage, and the respective adjusted bandwidth for a second associated portion of the route is predicted to provide a quality of coverage below the threshold quality of coverage;
   calculating a coverage buffer size to provide uninterrupted play of the streaming content by the mobile device over the route based at least on the predicted network coverage availability of the route; and
   calculating, for each cell tower, a respective adjusted bit rate by which to receive the streaming content via the cell tower in the associated portion of the route to maintain at least the coverage buffer size, including calculating a first respective adjusted bit rate for the first cell tower in accordance with first and second coverage buffer sizes calculated for the first and second associated portions of the route, respectively, such that streaming of the streaming content in the first associated portion of the route at the first adjusted buffer bit rate maintains uninterrupted play of the streaming content by the mobile device over the first associated portion of the route while also providing for the mobile device to have received an amount of content in accordance with the second coverage buffer size upon reaching the second associated portion of the route.

2. The method of claim 1, further comprising:
   requesting, by the mobile device as it travels the route, prior to reaching each associated portion of the route, the respective adjusted bit rate for the cell tower predicted to provide the service coverage for the mobile device in the associated portion of the route.

3. The method of claim 1, wherein calculating the coverage buffer size comprises:
   calculating, for each associated portion of the route, a respective coverage buffer size to provide uninterrupted play of the streaming content by the mobile device over at least the associated portion of the route based at least on a respective predicted physical speed of the mobile device in the associated portion of the route and the predicted network coverage availability associated with the associated portion of the route.

4. The method of claim 3, wherein:
the respective adjusted bit rate for a first cell tower is calculated to receive the streaming content via the first cell tower in a first associated portion of the route to maintain the respective coverage buffer size for a second associated portion of the route to be reached by the mobile device subsequent to passing through the first associated portion of the route.

5. The method of claim 1, wherein determining the route comprises predicting the route based on a historical route traversed by the mobile device.

6. The method of claim 1, further comprising:
limiting the coverage buffer size to a user buffer size limit in response to determining that the coverage buffer size is larger than the user buffer size limit as previously set by a user via a user interface of the mobile device.

7. The method of claim 1, wherein calculating the coverage buffer size is based further on a predicted duration of time for the mobile device to be serviced by each cell tower based on a predicted physical speed of the mobile device in each associated portion of the route.

8. The method of claim 1, wherein the calculating the respective adjusted bit rate for each cell tower comprises calculating a nominal bit rate and a buffer bit rate, the nominal bit rate being for playback of the streaming content by the mobile device, and the buffer bit rate being for buffering of the streaming content by the mobile device concurrent with the playback.

9. The method of claim 8, wherein the nominal bit rate is constant across the entire route.

10. A system comprising:
one or more processors; and
a memory communicatively coupled to the one or more processors having stored thereon instructions that, when executed by the one or more processors, cause the one or more processors to generating a buffering plan for a route of a mobile device over which the mobile device is determined to be receiving streaming content via a plurality of cell towers by:
determining the route;
identifying a plurality of cell towers predicted to provide service coverage for the mobile device as it travels along the route, such that each cell tower provides the service coverage for the mobile device via which to receive the streaming content in an associated portion of the route;
predicting a network coverage availability of the route by predicting, for each cell tower, a respective adjusted bandwidth available to provide the service coverage to the mobile device in the associated portion of the route, wherein the respective adjusted bandwidth for a first associated portion of the route is predicted to provide a quality of coverage above a threshold quality of coverage, and the respective adjusted bandwidth for a second associated portion of the route is predicted to provide a quality of coverage below the threshold quality of coverage;
calculating a coverage buffer size to provide uninterrupted play of the streaming content by the mobile device over the route based at least on the predicted network coverage availability of the route; and
calculating, for each cell tower, a respective adjusted bit rate by which to receive the streaming content via the cell tower in the associated portion of the route to maintain at least the coverage buffer size, including calculating a first respective adjusted bit rate for the first cell tower in accordance with first and second coverage buffer sizes calculated for the first and second associated portions of the route, respectively, such that streaming of the streaming content in the first associated portion of the route at the first adjusted buffer bit rate maintains uninterrupted play of the streaming content by the mobile device over the first associated portion of the route while also providing for the mobile device to have received an amount of content in accordance with the second coverage buffer size upon reaching the second associated portion of the route.

11. The system of claim 10, wherein:
the one or more processors and the memory are disposed in the mobile device; and
the instructions, when executed by the one or more processors, cause the one or more processors to generating the buffering plan further by requesting, by the mobile device as it travels the route, prior to reaching each associated portion of the route, the respective adjusted bit rate for the cell tower predicted to provide the service coverage for the mobile device in the associated portion of the route.

12. The system of claim 10, wherein the calculating the coverage buffer size comprises:
calculating, for each associated portion of the route, a respective coverage buffer size to provide uninterrupted play of the streaming content by the mobile device over at least the associated portion of the route based at least on a respective predicted physical speed of the mobile device in the associated portion of the route and the predicted network coverage availability associated with the associated portion of the route.

13. The system of claim 12, wherein the respective adjusted bit rate for a first cell tower is calculated to receive the streaming content via the first cell tower in a first associated portion of the route to maintain the respective coverage buffer size for a second associated portion of the route to be reached by the mobile device subsequent to passing through the first associated portion of the route.

14. The system of claim 10, wherein the determining the route comprises predicting the route based on a historical route traversed by the mobile device.

15. The system of claim 10, wherein the instructions, when executed by the one or more processors, cause the one or more processors to generating the buffering plan further by:
limiting the coverage buffer size to a user buffer size limit in response to determining that the coverage buffer size is larger than the user buffer size limit as previously set by a user via a user interface of the mobile device.

16. The system of claim 10, wherein the calculating the coverage buffer size is based further on a predicted duration of time for the mobile device to be serviced by each cell tower based on a predicted physical speed of the mobile device in each associated portion of the route.

17. The system of claim 10, wherein the calculating the respective adjusted bit rate for each cell tower comprises calculating a nominal bit rate and a buffer bit rate, the nominal bit rate being for playback of the streaming content by the mobile device, and the buffer bit rate being for buffering of the streaming content by the mobile device concurrent with the playback.

18. The system of claim 17, wherein the nominal bit rate is constant across the entire route.

* * * * *